United States Patent [19]
Hoopengardner

[11] Patent Number: 5,384,001
[45] Date of Patent: Jan. 24, 1995

[54] CARPET SEAMING APPARATUS AND METHOD

[75] Inventor: Merle R. Hoopengardner, Lafayette, Calif.

[73] Assignee: Step Loc Corporation, Lafayette, Calif.

[21] Appl. No.: 184,432

[22] Filed: Jan. 14, 1994

Related U.S. Application Data

[63] Continuation-in-part of Ser. No. 4,907, Jan. 14, 1993.

[51] Int. Cl.$^6$ .............................................. B29C 65/00
[52] U.S. Cl. ................................. 156/391; 156/304.4; 156/304.6; 156/579; 156/577; 219/245
[58] Field of Search ............... 156/304.4, 304.7, 378, 156/574, 577, 579, 391, 304.6; 219/245

[56] References Cited

U.S. PATENT DOCUMENTS

| | | | |
|---|---|---|---|
| 3,400,245 | 9/1968 | Burgess | 219/245 |
| 3,523,176 | 8/1950 | Hill | 219/245 |
| 3,748,211 | 7/1973 | Hoopengardner | 156/575 |
| 3,927,298 | 12/1975 | Prater | 219/245 |
| 4,484,976 | 11/1984 | Despins | 156/578 |
| 4,536,244 | 8/1985 | Greci et al. | 156/304.4 |
| 4,584,040 | 4/1986 | Anderson | 156/304.4 X |
| 4,714,514 | 12/1987 | Hoopengardner | 156/304.4 X |
| 4,745,263 | 5/1988 | Brooks | 156/304.7 X |
| 4,749,433 | 6/1988 | Johnston et al. | 156/304.4 |
| 4,919,743 | 4/1990 | Johnston et al. | 156/304.4 |
| 5,250,145 | 10/1993 | Despins et al. | 156/304.7 X |

Primary Examiner—Michael W. Ball
Assistant Examiner—J. Sells
Attorney, Agent, or Firm—Thomas M. Freiburger

[57] ABSTRACT

A carpet seaming system and method include a seaming tape iron, a hot melt carpet seaming tape and a method of installation wherein seam peaking is minimized. The seaming iron has a grooved base plate and connected liquid channels which accomplish seam welding of carpet backings at the seam. The device feeds molten adhesive from the tape through the base plate of the iron up to an elevated location at or near a rear end of the iron, in a position to be picked up by and applied to opposed edges of the two carpet backings as the iron is moved along on the carpet seaming tape. As the two carpet edges come together behind the iron, the backings are seam welded or seam sealed by the liquid adhesive in a butt joint, adding significant strength to the seam in the carpet. In one embodiment, the carpet seaming iron further includes a tape dispenser connected to the iron, for storing and feeding a roll of hot melt seaming tape under the front of the iron's base plate as the iron advances along the tape. The carpet seaming tape has a narrow hot melt adhesive strip, preferably less than two inches wide. The carpet seaming tape may be used in conjunction with seam sealing, wherein hot melt adhesive is applied between the edges of the carpet backings to seal the seam between the two sections of carpet. With the narrow tape and seam sealing, the assembled carpeting when stretched will not tend to peak significantly at the seam.

15 Claims, 9 Drawing Sheets

CARPET SEAMING APPARATUS AND METHOD

REFERENCE TO RELATED APPLICATION

This application is a continuation-in-part of application Ser. No. 08/004,907, filed Jan. 14, 1993.

BACKGROUND OF THE INVENTION

This invention relates generally to equipment for attaching adjacent pieces of carpet together to form a secure seam which will withstand stretching. More particularly, the invention is concerned with a seaming iron and hot melt carpet seaming tape, wherein the iron is tracked over the tape and between the adjacent carpet edges so that adhesive on the tape is melted and the seam made as the iron progresses forward.

Hot melt carpet seaming tape and irons for use with the tape are well known. For example, see U.S. Pat. Nos. 4,536,244, 4,714,514, 3,748,211, 3,927,298, 3,523,176 and 3,400,245.

In the 1960s, carpet seaming tape largely replaced seam stitching as a means of joining two pieces of carpet together for a stretched carpet installation. The use of the hot melt carpet seaming tape, applied to the carpet backings while the carpet lies in the finished, face up position, has been far more efficient than seam stitching.

However, a problem with carpet seaming tape has been that it exhibits seam peaking when stretched. Tension across the seam is accepted by the tape, through its width, with the carpet above not encountering as much tension as the tape. The carpet seaming tape has a thickness which is apparently sufficient to contribute to the problem of peaking, by raising the line of tension somewhat at the joint, thereby tending to raise the tape to the mid-level of the carpet backing in the surrounding areas of the carpet. The causes of seam peaking have to do with the relatively thick carpet backings being held together only along the plane of their bottom surfaces. The carpet pile protrudes upwardly at the joint, forming a small peak at the seam line.

The causes of seam peaking have not always been completely understood. For example, one attempt to alleviate this problem was to increase the width of the carpet seaming tape and of the hot melt adhesive on the tape, from about three inches to about six inches. See Johnston et al. U.S. Pat. Nos. 4,749,433 and 4,919,743. This was only effective to spread out the rise of the carpet over a wider area, with seam peaking still occurring and being very noticeable at the seam line between the carpet pieces. As explained below, the present invention takes the opposite approach, by providing a far narrower band of hot melt adhesive on a carpet seaming tape.

It has been recognized previously that a carpet seam can be made with greater integrity if a portion of the hot melt adhesive is applied against the edges of the carpet backing, to form a butt seam or welded seam wherein the actual edges of the carpet backing are strongly bonded together, in addition to the connection made by adhesion of the tape to the bottom side of both pieces of carpet on either side of the joint. For example, the above referenced U.S. Pat. No. 4,536,244 discloses an iron base plate having a deep center groove and a chevron formation for gathering melted adhesive in a raised center bead formed on the tape as the seam is being made with the iron. The object of the raised center bead was to cause molten adhesive to be applied to the side edges of the backings as those backings were lowered onto the tape behind the iron.

U.S. Pat. No. 4,536,244 also mentioned that carpet manufacturers have suggested the installer should manually apply liquid solvent or water based (latex) adhesive to the backing edges, before hot melt seaming. However, any latex adhesive applied to areas where hot melt is to be received will reduce the bond strength of the hot melt adhesive.

A manual tool for applying liquid (not hot melt) adhesive to side edges of linoleum and carpet backings was disclosed in Despins U.S. Pat. No. 4,484,976.

In addition, U.S. Pat. No. 4,536,244 made a brief reference that the carpet seaming tape used in conjunction with the seam welding technique could be made narrower for reasons of economy, due to the added strength afforded by the strong butt welded joint between the carpet backings. However, the patent did not suggest the structure of the carpet seaming tape of the present invention, nor did the patent recognize or suggest that a narrow strip of adhesive on a carpet seaming tape, in conjunction with seam welding wherein the edges of the carpet backings are butt-joined, can provide the benefit of reducing and nearly eliminating seam peaking in a stretched carpet installation.

In accordance with the present invention described below, it has been discovered that the edge bonding of the carpet backings at the seam, particularly when accompanied by the use of a very narrow tape not contemplated for this purpose in the prior art, provides a strong seam which will exhibit little or no seam peaking. A seaming iron, narrow-adhesive band type and a method of installation are provided for this purpose.

SUMMARY OF THE INVENTION

A carpet seaming tape iron according to the present invention forms a high integrity welded, butt seam between the side edges of the carpet backings, by delivering molten hot melt adhesive from the tape against both backing edges, before the carpet edges are laid down against the tape. The iron has one or more internal channels or ducts through which molten adhesive gathered at the bottom of the iron is conducted up to an elevated position at the rear of the iron. There, the molten adhesive is applied directly to the carpet edges as the iron moves past them. The edges of the carpet backing are elevated, essentially at the height at the top of the iron's base, when the molten adhesive is applied. The molten adhesive seals the carpet backing edge, ultimately welding the two carpet backing edges together. Additionally, the hot molten adhesive impregnates the carpet backing around the edge, which in itself produces a stronger and more uniform seam.

The iron has a grooved base plate which helps collect the molten glue being melted along the base, and the adhesive duct or ducts lead, in a preferred embodiment, from a wide center groove to the elevated point of dispensing and application. In one preferred embodiment of the present invention, the iron further includes a tape dispenser connected to the iron and storing a roll of hot melt carpet seaming tape for use in the seaming operation. The tape dispenser feeds the hot melt seaming tape down between the opposed carpet edges to the front of the iron. For this purpose a tapered carpet edge separator device preferably is included in front of the tape, to spread the carpet and allow the tape to pass through. This avoids the need for the tape to be laid out and accurately centered beneath the joint of the two carpet pieces prior to the use of the iron.

It has been found that if the hot melt tape applied by the seaming iron is narrow, or at least with the hot melt adhesive being in a narrow strip on the tape, and the side edges of the backings are butt bonded together as described, seam peaking is minimized and nearly eliminated. In one embodiment of the present invention the carpet seaming tape itself is only one inch to 1¼ inch wide, with the hot melt adhesive covering substantially the upper surface of the tape. In another embodiment the tape substrate itself is wider (such as about three inches wide), of a width commensurate for use with conventional carpet seaming tape irons. The strip of hot melt adhesive, however, covers only the center approximately one inch to 1¼ inch of the tape (in any event less than 2 inches). In this embodiment the remaining width of the tape, to left and right of the hot melt adhesive, can have a hot melt pressure sensitive adhesive which will permit shear movement of the carpet on these peripheral areas of the tape when the installation is stretched, as discussed further below. The tape serves to isolate the hot iron face plate from contact with the floor or a carpet cushion below the carpet.

It has been found that the very narrow band of active adhesive of the tape of this invention, combined with the strong bond afforded by seam welding or butt joining of the edges of the carpet backings at the joint, reduces and substantially eliminates the problem of seam peaking in the stretched carpet. Seam peaking could be completely eliminated, at least in theory, if seam welding alone could be employed, without any carpet seaming tape. It is probably not possible with present adhesives to achieve a seam weld of high enough integrity for this purpose, and in addition, the system of the invention preferably relies on the tape to supply hot melt adhesive for the seam welding.

In one embodiment of the present invention, a carpet seaming tape for joining carpet backings in a stretched carpet installation includes a carrier strip as a backing or substrate for the carpet seaming tape, the carrier strip being substantially impervious to the flow of melted adhesive. Reinforcing means are secured to the upper surface of the carrier strip, to give lateral strength to the carpet seaming tape. A strip of hot melt adhesive is on the upper surface of the tape, preferably applied over the reinforcing means. As is well known in hot melt carpet seaming tapes, the adhesive is capable of being melted by a carpet seaming tape iron so as to allow the adhesive to adhere the tape to a carpet backing. The hot melt adhesive strip on the carpet seaming tape is less than about two inches wide, and in specific preferred embodiments the adhesive is about one inch to 1¼ inches wide.

The tape itself, including the carrier strip, may be limited essentially to the width of the hot melt adhesive strip. However, in one preferred embodiment as described above, the overall dimension of the tape is wider than the hot melt adhesive strip, with the carrier strip extending to left and right of the adhesive, providing a significant carrier strip margin on each side of the hot melt adhesive and making a wider bearing surface for the iron. The carrier strip margins, as outlined above, may be coated with a pressure sensitive adhesive which assists in installation but which will shear laterally when the carpet is stretched across the seam. The pressure sensitive adhesive becomes "leggy" (which the central hot melt adhesive does not), transferring stretch load to the center of the seam while still providing additional strength and helping maintain the integrity of the carpet joint after the installation is complete. This marginal pressure sensitive adhesive should be a hot melt type since it will be engaged by the hot iron.

Preferably a protective coating or agent is provided on the marginal pressure sensitive adhesive, so that this adhesive does not stick to the carpet backing or block in the roll. The coating or agent can be a meltable, thin polypropylene film, for example, or a talc formed of polypropylene or a meltable plastic material with similar properties. On engagement with the hot seaming tape iron this coating simply melts and becomes part of the adhesive, having no adverse effect on the installation.

It is therefore among the objects of the present invention to provide improved hot melt carpet seaming iron and tape for joining two pieces of carpeting, and an associated method of forming an improved, high integrity carpet seam which exhibits little or no seam peaking. These and other objects, advantages and features of the invention will be apparent from the following description of a preferred embodiment, considered along with the accompanying claims.

DESCRIPTION OF PREFERRED EMBODIMENTS

Figure 1:
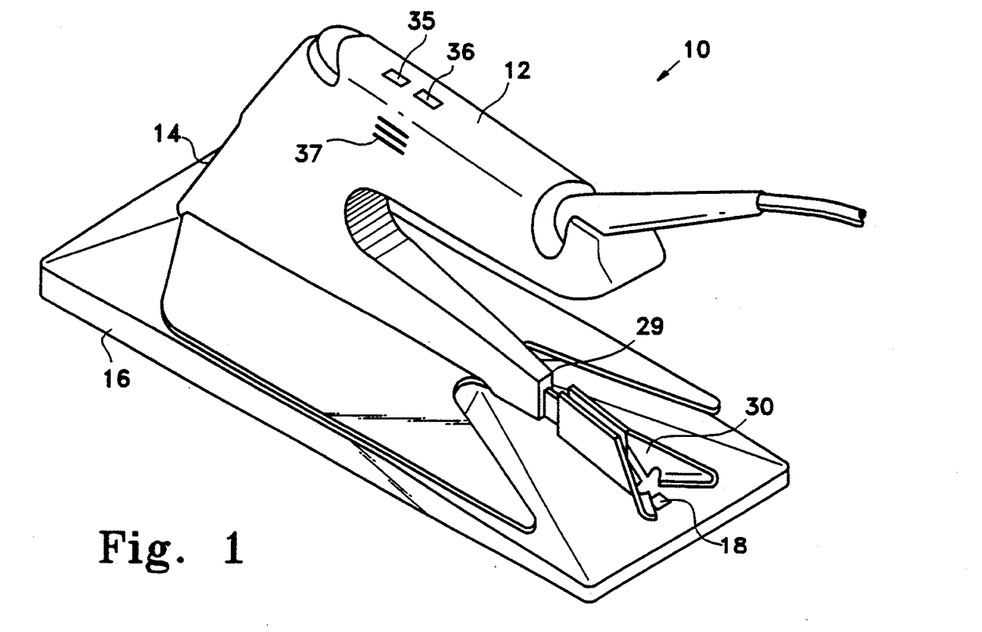
FIG. 1 is a perspective view showing a carpet seaming tape iron according to the invention.
Figure 1A:
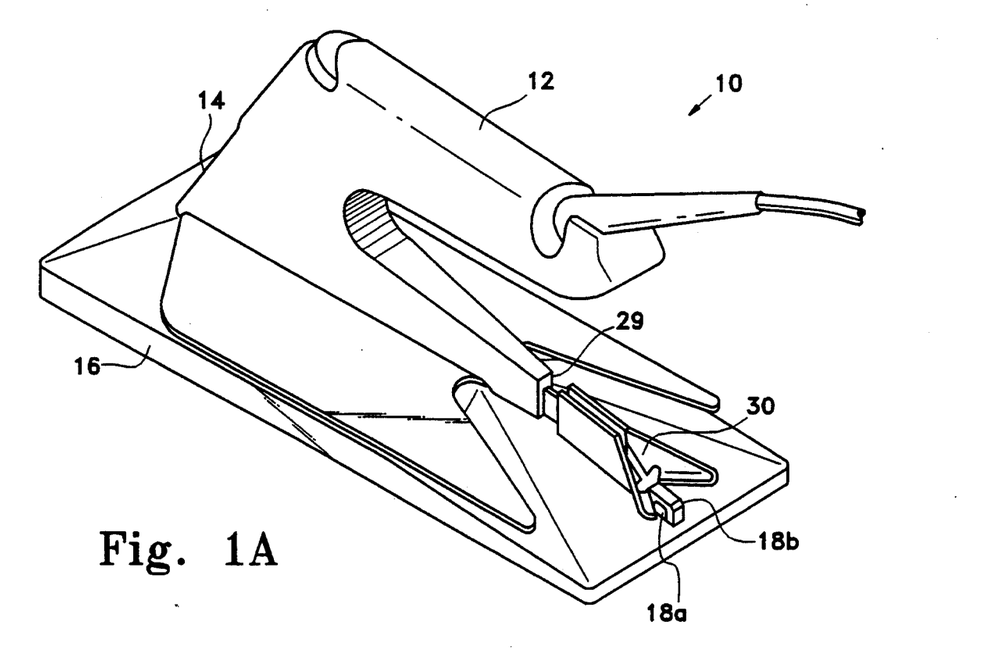
FIG. 1A is a view similar to FIG. 1 but showing a modified embodiment of the iron of FIG. 1.
Figure 1B:
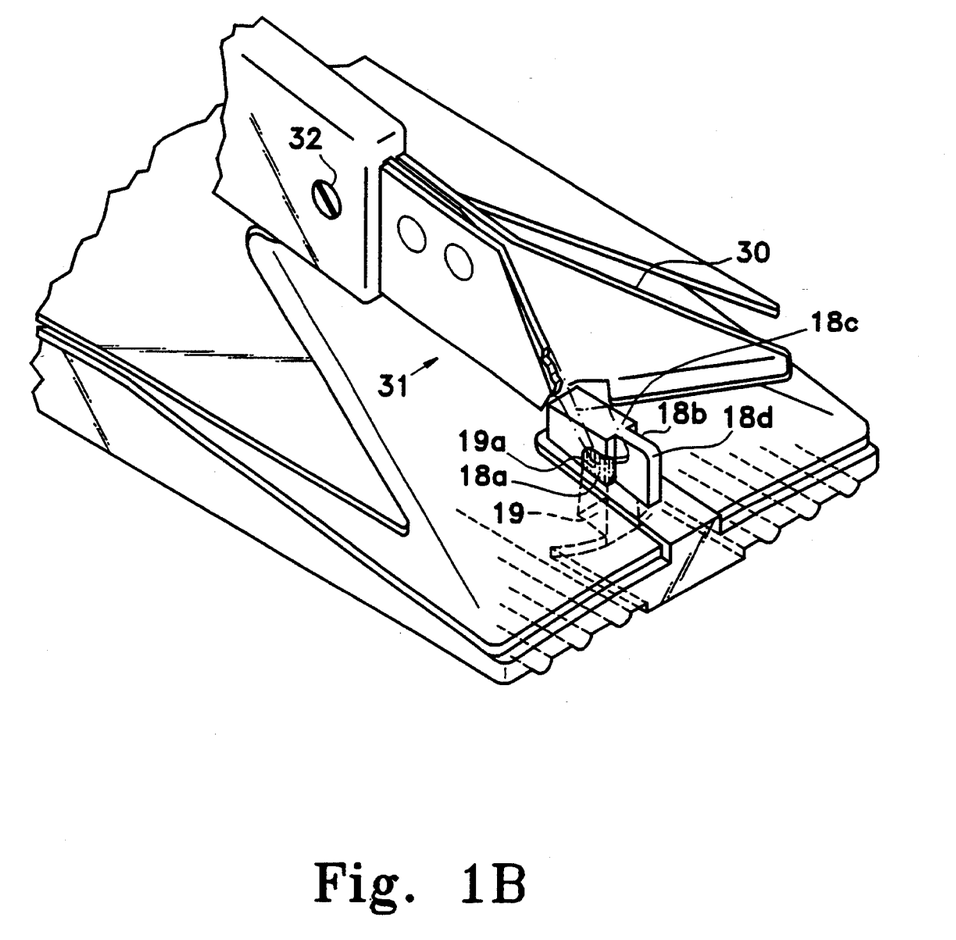
FIG. 1B is a detail view in perspective showing a component of the iron of FIG. 1A.

The drawings show a carpet seaming tape iron 10 having a handle 12, a body 14 and a base plate 16. Near the back of the iron in this embodiment is a central outlet 18 for liquid hot melt adhesive which has been melted at the bottom of the base plate 16 and conducted up to the outlet 18 through internal ducting 19 (FIG. 3) explained further below. FIG. 1 shows the single, central outlet 18 for molten adhesive, while FIG. 1A shows a side by side pair of left and right outlets 18a and 18b. FIG. 1B shows these outlets in greater detail.

As discussed above and as illustrated particularly in FIG. 4, the outlet 18 (or outlets 18a and 18b) delivers molten adhesive 20, collected from the surface of a hot melt carpet seaming tape 22 below, to the side edges 24 of adjacent carpet backings of two pieces of carpet 26 and 28 which are to be joined and seamed. The molten adhesive outlet or outlets are positioned so that the edges of the carpet backings must come into contact with and thus pick up the molten adhesive. In this way, the adhesive is "buttered" onto the edges of the carpet backings at a point where the carpet pieces are close together, adjacent to a narrow trailing end 29 of the iron's handle where the carpet pieces are minimally spread apart. If twin adhesive outlets 18a and 18b are included, they are directed divergently, to left and right as shown, in order to direct the flow of molten adhesive toward the carpet backing edges. Additional outlets may be included at the rear of the iron, to direct molten adhesive to the carpet backing, not just the carpet backing edge (additional outlets not shown).

The advantages of "buttering" the edges of the carpet backings were discussed above. A high strength joint is produced, and if this butt seaming procedure is used in conjunction with a very narrow band of carpet seaming tape adhesive across the carpet joint, the result will be a high integrity joint which exhibits minimal seam peaking.

The detailed view of FIG. 1B shows the molten adhesive outlets 18a and 18b in a specific preferred configuration. The adhesive flows up from the bottom of the base plate through the internal channel 19, partially shown in dashed lines. The molten adhesive then reaches a chamber 19a above the base plate, which is the upper portion of the internal duct or channel 19. The adhesive is forced outwardly, to the side and back through the outlets 18a and 18b, as further molten adhesive accumulates at the baseplate. The outlet structure includes a central block element 18c which, as shown in FIG. 1B, has a width sufficient to hold the carpet backing edges slightly apart and leaving the exiting adhesive ample room to flow out from the openings 18a and 18b. A central fin or tail element 18d is narrower than the block 18c, for the purpose of allowing the adhesive to flow freely.

Figure 3:
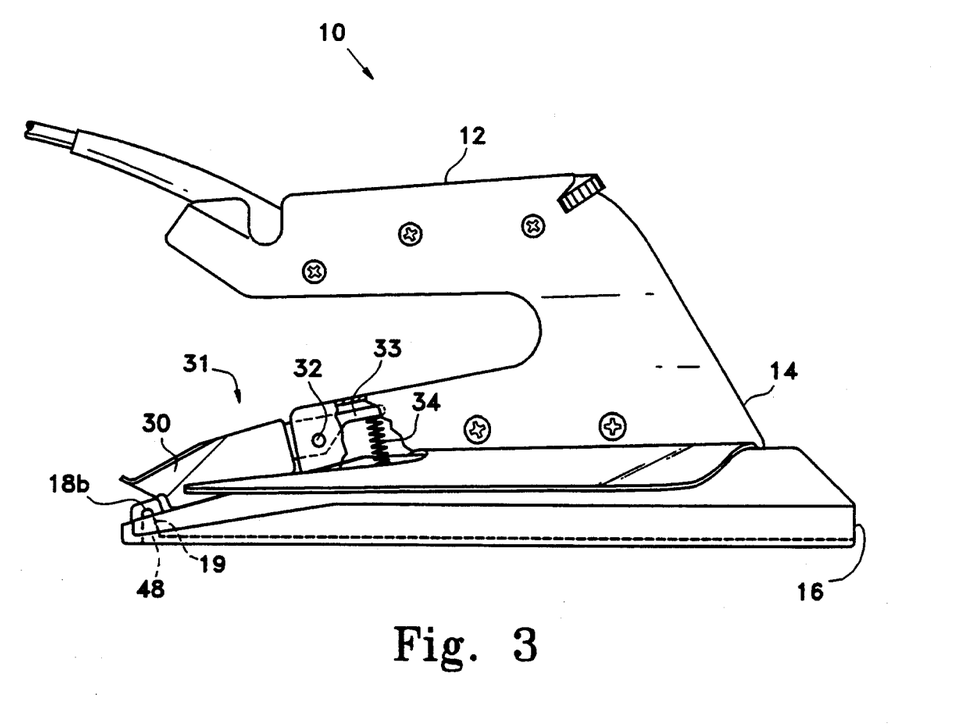
FIG. 3 is a side elevation view of the iron showing (in dashed lines) a molten adhesive flow channel extending from the iron's base plate up to a position of application to carpet edges.
Figure 4:
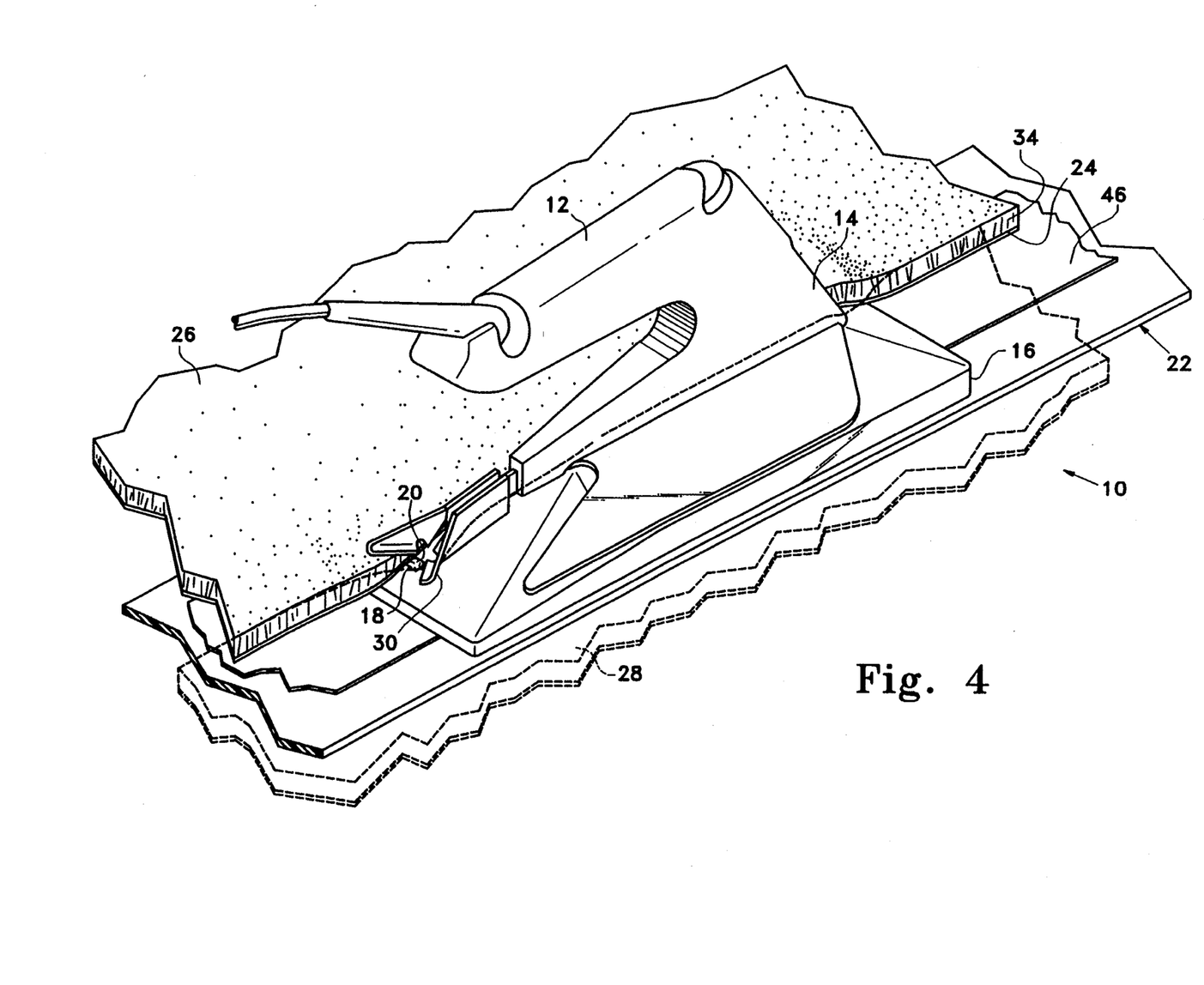
FIG. 4 is a view showing the carpet seaming iron in use, with molten adhesive being applied to the opposed side edges of carpet backings.

FIGS. 1, 3 and 4 show a preferred configuration of the iron 10 at the location where the molten adhesive is applied to the carpet pieces. Carpet edge guides 30 on either side, which with connected structure form a tail piece 31, engage the backing and edges of the carpet pieces, guiding them in a predictable path and also helping to assure that the iron 10 remains centered as it advances between the carpet pieces. The carpet is guided in such a way that it must pass closely adjacent to the outlet orifice 18 (or the outlet orifices 18a or 18b); and the configuration shown also avoids the application of liquid adhesive onto the carpet pile or fibers 34 (FIG. 4), keeping the adhesive at the backings. Additionally, the guide 30 of the tail piece 31, which in the configuration shown is wing-shaped, spreads the carpet pile or fibers aside, thereby exposing the carpet backing for easy viewing. This allows an operator to actually see the application of hot melt to the edges, and to ensure that the edges are joined properly, e.g. with no separation or overlap.

As shown particularly in FIG. 3, the tail piece 31 is pivoted about a pivot fastener 32 so that it can swing upwardly to accommodate thicker carpets. A front extension 33 of the tail piece, shown as inside the iron in FIG. 3, is biased upwardly by a compression spring 34 to spring bias the guide 30 downwardly against the carpet pieces.

FIG. 1 also shows a pair of indicator lights 35 and 36 which preferably are included on a preferred embodiment of the carpet seaming iron. The two indicator lights include one light, which may be the indicator light 35, which informs the user that the iron is connected to power, i.e. its heating element is powered. The other indicator light tells the operator light when the iron is heated up to appropriate temperature for performing carpet seaming. Preferably the light indicating power to the heating element is red, while the light indicating operating temperature is green, although other colors can be selected. The circuitry for connection of these indicator lights, which may be LEDs, is relatively simple and well known to those skilled in the art, and thus is not represented in the drawings. The indicator light showing appropriate operating temperature involves a temperature probe and associated circuitry and has been applied in other contexts involving other electrical appliances.

FIG. 1 also indicates a speaker outlet 37 for an audible signal such as a beeper, which signals to the user audibly that the iron is up to operating temperature, when the iron first reaches that temperature. Circuitry for the beeper or signal is not illustrated, since such a signal is well within the skill of the art. Various types of noise makers can be selected, such as the type used on computers, microwave ovens, or household irons. Another function of the audible signal 37, which may be included in a preferred embodiment of the iron is a warning function to indicate to the user a condition that the iron has been "on" and hot for a selected period of time, with the iron not having moved during that period of time. Again, circuitry for this feature of the audible warning signal is not included herein, because this function is known from household irons used for pressing clothes.

Figure 4A:
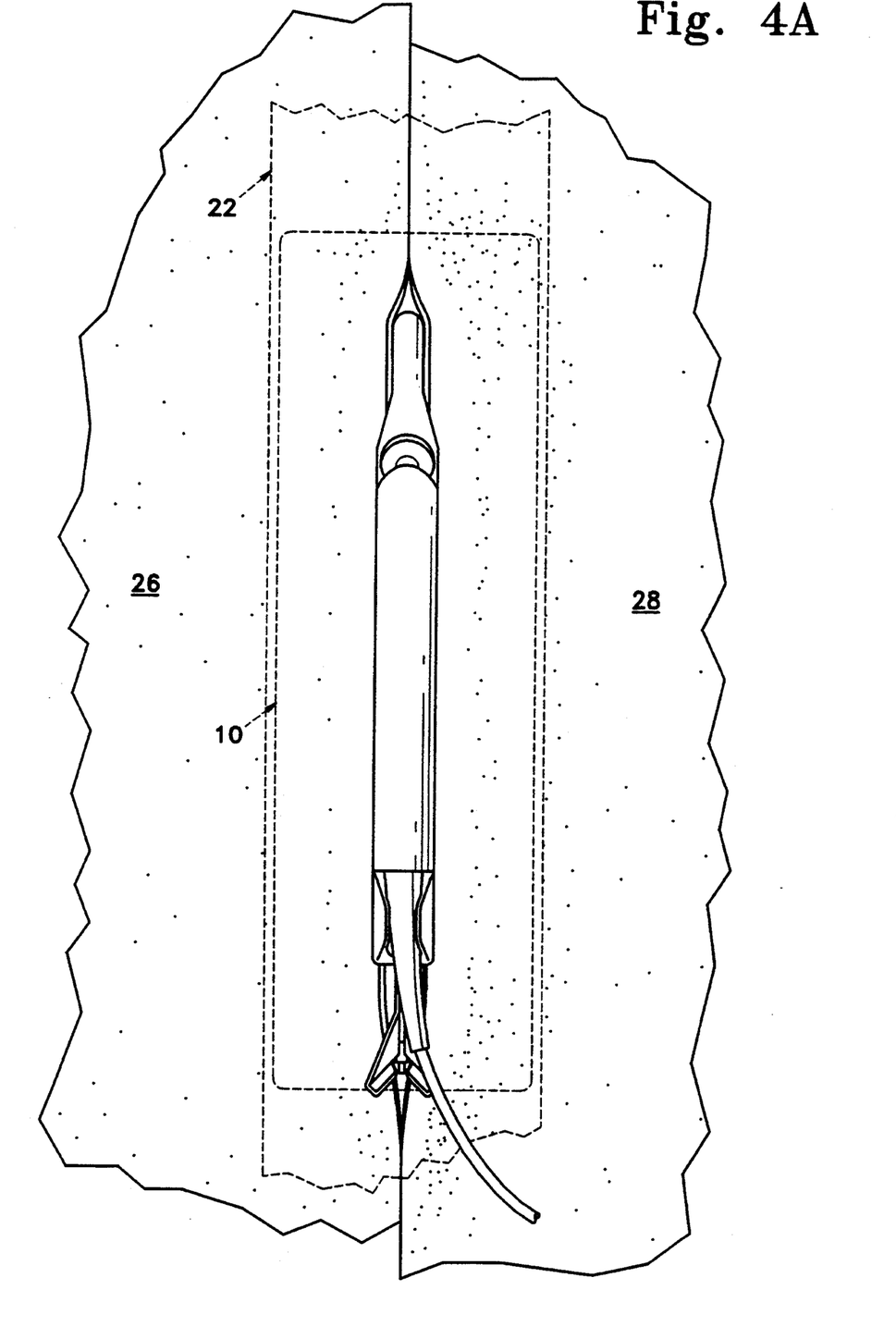
FIG. 4A is a schematic plan view showing the carpet seaming operation with the iron of the invention.

As seen in FIG. 4A, the carpet pieces come together edge to edge at the rear of the iron 10, forming the desired welded butt joint between the carpet backings. As the iron advances, the carpet is lowered onto the carpet seaming tape 22 with the edges essentially already butt joined. The seam is completed by the engagement of the carpet backings, at either side of the joint, into the molten adhesive on the surface of the tape 22.

It is usually desirable to put some pressure down against the carpet joint, to assure that the carpet backings become thoroughly engaged with the adhesive on the tape. For this purpose, the iron may include an optional roller 40 (FIGS. 5 and 6) which is downwardly biased (as by a spring, not shown) and which extends immediately behind the iron as shown.

Figure 2:
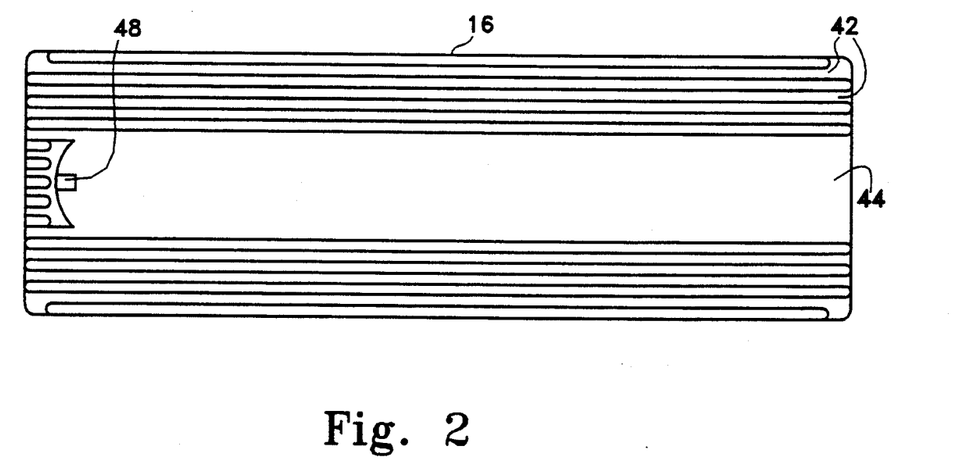
FIG. 2 is a bottom plan view showing the base plate of the iron.

FIG. 2 shows the bottom of the base plate 16, having in this preferred embodiment a series of longitudinal grooves 42 on either side of center and a large center groove 44, considerably wider than any of the grooves 42 on either side. The center groove may be about 1¼ inch wide, and this groove serves several purposes. It tends to center itself on a strip of hot melt adhesive 46 on the carpet seaming tape 22, with the adhesive 46 comprising in a preferred embodiment only about a 1 inch to a 1¼ inch strip on the center of the tape (in this case only the center groove 44 actively engages the narrow band of adhesive). Since the iron rides over the tape with the glue solid and unmelted under the front portion of the iron's base plate, the tape will tend to guide the iron to keep it in the proper path along the tape, or, viewed another way, this will tend to keep the tape centered with the iron. This is very important when the strip of adhesive is so narrow (only about ½ inch to ⅝ inch adhesive width on either side of the joint) as in the narrow—adhesive seaming tape embodiment. It can be seen that the carpet edge guides 30 cooperate with this tape centering feature—the edge guides 30 maintain the iron centered relative to the carpet, while the center groove and adhesive tracking in that groove keep the tape centered on the iron's base, and thus on the carpet joint, i.e. keep the tape and iron centered relative to one another.

Another purpose of the wide center groove 44 is to gather adequate molten adhesive in this groove so that some will travel up through the duct or channel 19, the bottom opening 48 of which is seen in FIG. 2. As outlined earlier, the molten adhesive travels up through the duct or channel(s) 19 to be delivered through the outlet orifice(s) at a position to be applied to the edges of the carpet backings. The forward movement of the iron along the carpet seaming tape creates adequate pressure to force the molten adhesive up through the bottom orifice 48 and through the internal channel to the top of the base plate. If desired, the wide center groove 44 can be tapered to a slightly shallower depth at the trailing end of the iron, in order to create additional pressure and move additional adhesive up through the channel or duct 19 as the iron moves forward, for application to the carpet edges.

It should be pointed out that the above discussion assumes a carpet seaming tape having a very narrow strip of hot melt adhesive 46 which, in combination with the edge welding of the carpet backings as discussed above, creates a joint which will tend to peak only very minimally or not at all upon stretching of the carpet. Further, this discussion assumes that the iron 10 is wider than the operative portion of the carpet seaming tape, i.e. the strip of adhesive 46 (irons have conventionally been wider than this). The carpet seaming tape can have a remaining width which is merely paper or reinforced paper, to accommodate the width of the iron. In one embodiment of a tape described below, the excess width can bear a different, low shear strength adhesive.

It should be pointed out that the carpet seaming tape can be made much narrower, only slightly wider than the width of the narrow strip of hot melt adhesive. The width can include ¼ inch of paper on each side, sufficient to contain the hot melt adhesive against running over onto the under pad. In this case the iron itself can be much narrower (without a wide center groove) so that only the tape is contacted and not the pad or floor beneath. A smaller and more efficient tool is thus possible, not shown in the present drawings.

Additionally, the iron of the invention can be used with carpet seaming tape that is much wider, such as typical wide carpet seaming tape that is on the order of 4" side (or 6" wide), still retaining the benefits of carpet seam edge welding (and an onboard tape dispenser as described below). In this case the iron itself can be much wider, on the order of the width of the tape or slightly narrower, but preferably not wider than the tape itself.

Figure 5:
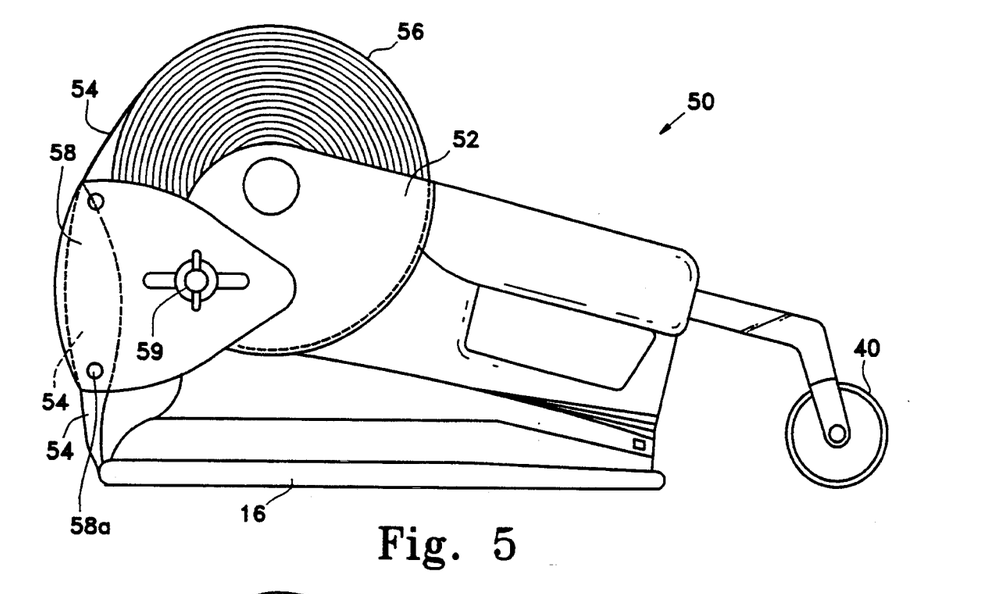
FIG. 5 is a view showing the iron of the invention with an attached dispenser at the front of the iron for carpet seaming tape.
Figure 6:
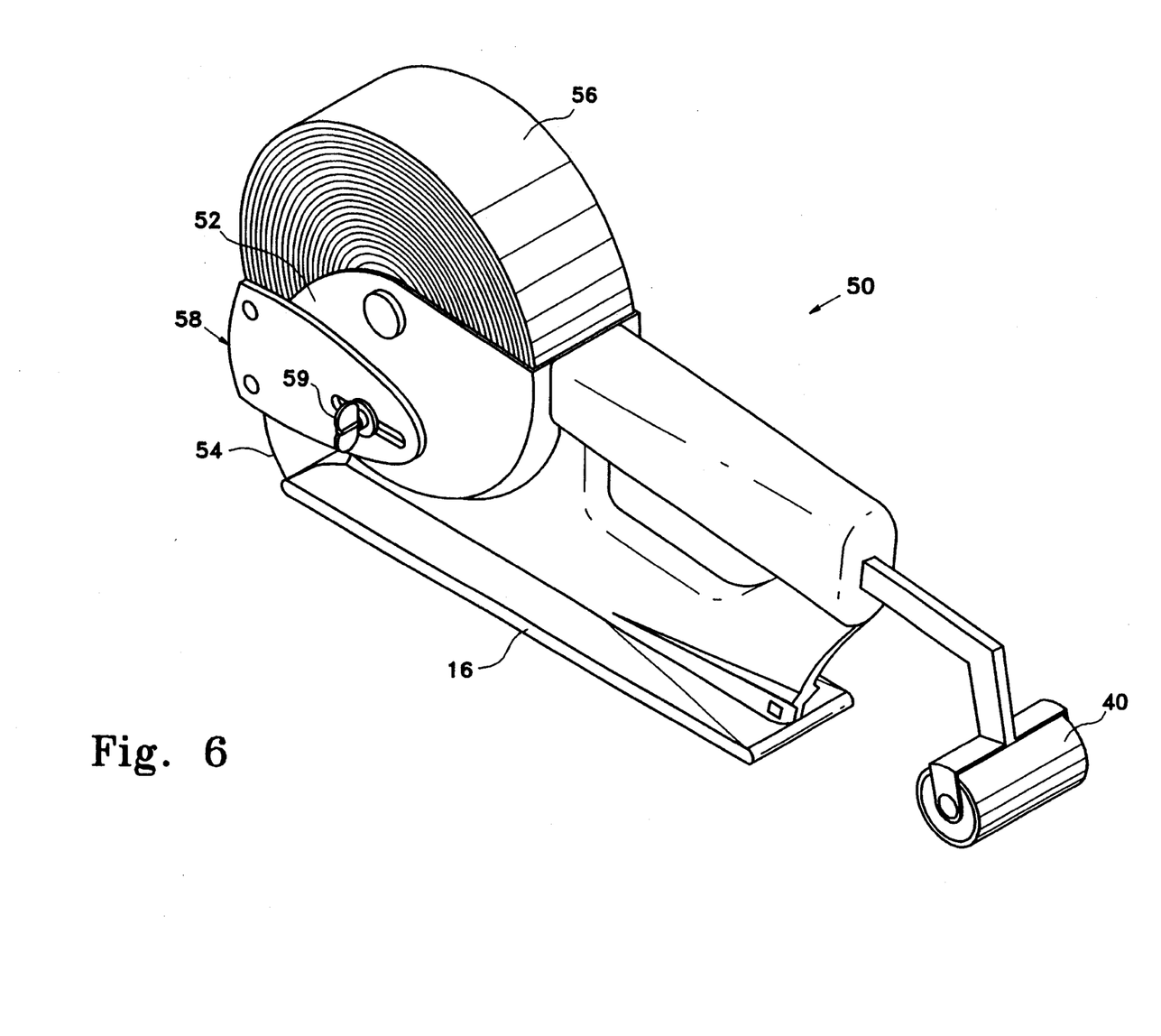
FIG. 6 is another view showing the iron of FIG. 5, and indicating the movement of carpet seaming tape from the dispenser down between the carpet edges and under the iron.

FIGS. 5 and 6 show a modified embodiment of an iron 50 according to the invention, with a tape dispenser 52 secured to the handle portion of the iron and extending over the front of the iron. The tape dispenser 52, which has some features in common with the dispenser shown in U.S. Pat. No. 3,748,211, is positioned to deliver carpet seaming tape 54 from a roll 56 down between the carpet edges as seen in FIG. 6 to be taken under the front edge of the iron's base plate 16. The tape 54 must be lightly folded or cupped, without creasing, to pass smoothly between the carpet edges. For this purpose, the device has a rounded front deflector 58 which houses and cups the tape while spreading the carpet. The deflector 58 can be adjusted forward or back and rotated downwardly or upwardly via a tightener screw or wing nut 59. This also allows the deflector 58 to be swung up and out of the way when the iron approaches a wall. FIG. 5 shows one of a pair of posts 58a which can be included to hold the carpet edges up, above the exposed tape 54, although these generally are not needed if the deflector is adjusted properly.

The combination iron and tape dispenser 50 adds efficiency and speed to the carpet seaming tape operation, by eliminating the need for the installer to lay out the seaming tape underneath the joint between the unseamed carpet sections, prior to use of the iron. The tape dispenser 52 may be pivotally mounted as shown, or mounted so as to be removed easily, by snapping it off the handle, when the installer reaches a wall. This will allow the front edge of the iron to advance to the wall. Another way of addressing this situation is to position the tape dispenser so that it protrudes forward less than the front edge of the base plate.

The iron 50 with the tape dispenser 52 is particularly adaptable to narrow carpet seaming tape, or to tape as described above with a narrow strip of hot melt adhesive. This is because of the need for the tape to pass down between the carpet edges; a narrow tape, or a tape with more flexible outer portions due to the lack of reinforcing and/or hot melt adhesive in those portions, can be guided more easily and smoothly between the carpet edges, requiring little or less drastic folding.

Figure 7:
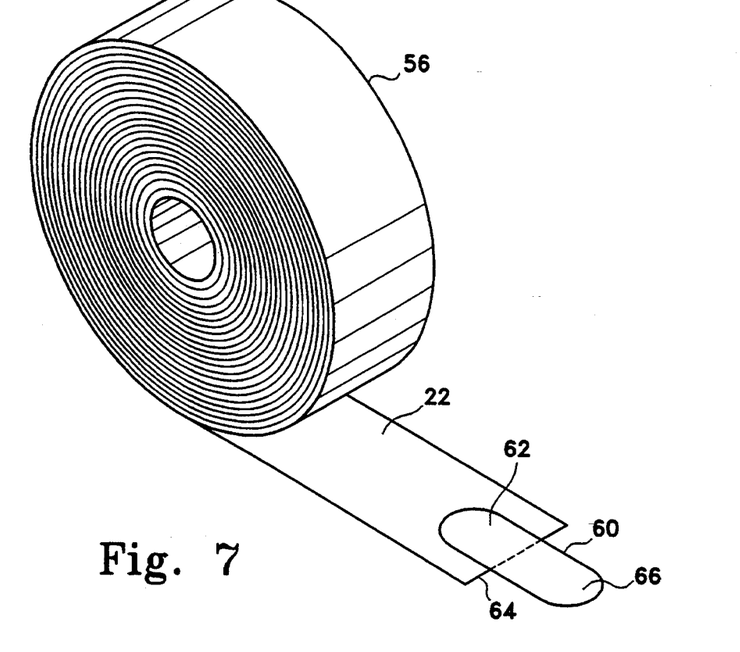
FIG. 7 is a detail view showing a splicing device on the leading end of a roll of carpet seaming tape.

FIG. 7 shows a splicing device 60 for the roll-stored tape 22. Splicing is needed when the end of the roll 56 is reached. The splicing means 60 illustrated comprises a strip of meltable plastic tape 62 adhered to the active surface of the tape 22 at its leading end 64, with an extending, overlapping portion 66 of the plastic strip being attachable to the active surface of the end of the tape which has just run out. The extending portion 66 has pressure sensitive adhesive on its lower side for sticking down to the top surface of the carpet seaming tape already laid. A removable release film (now shown) may cover the pressure sensitive adhesive until the splice is made.

Figure 8:
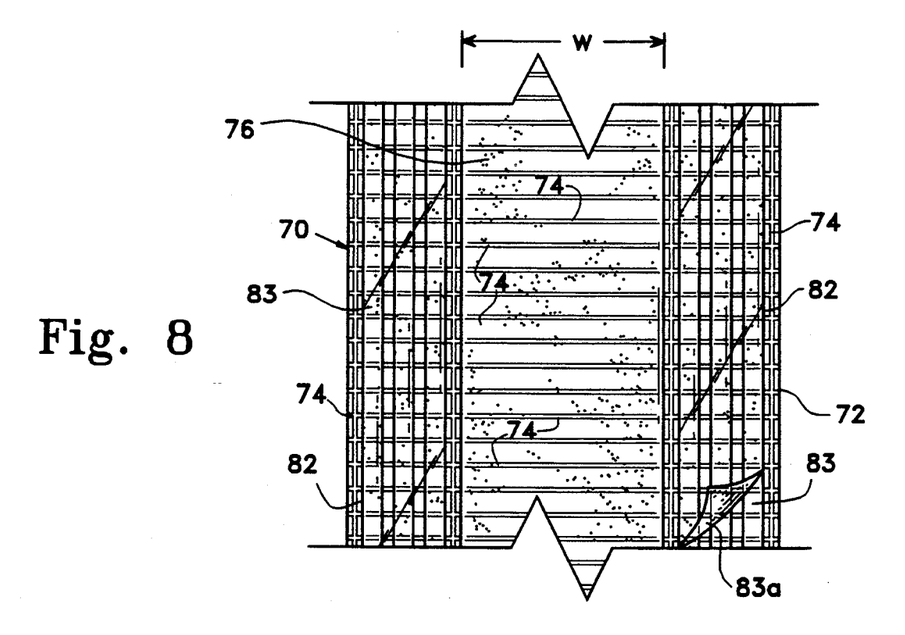
FIG. 8 is a plan view showing a carpet seaming tape in accordance with the principles of the invention.

FIG. 8 shows a carpet seaming tape 70 in accordance with a preferred embodiment of the invention. The tape 70 comprises a carrier strip or substrate 72 (generally kraft paper), with reinforcing means 74 on the upper surface of the carrier strip and a strip or band of hot melt adhesive 76 extending centrally through the carrier and the reinforcing means.

As FIG. 8 illustrates, the reinforcing means 74 may comprise a nonwoven scrim with fiberglass as the width fibers, as is typical of hot melt tapes. Techniques for producing hot melt tapes are well known, and are exemplified by those carpet seaming tapes produces by Orcon Corporation, Conso, Seam Master, Roberts, Bond Narrow Fabric and others. The hot melt adhesive 76 is deposited onto the reinforcing fibers and the carrier strip or substrate in a molten or semi-molten condition at an elevated temperature, and this deposition may be by extrusion of the flowable adhesive.

Figure 10:
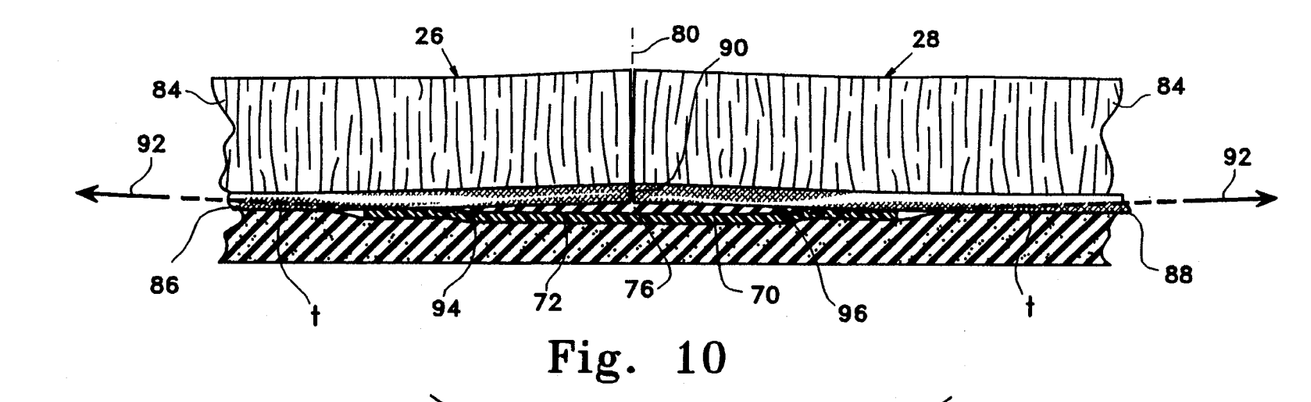
FIG. 10 is a sectional view taken through a carpet joint, showing a carpet seaming tape as in FIG. 8 secured to the bottom sides of the carpet backings of two adjacent pieces of carpeting, and indicating stretching tension through the seam.

As discussed above, an important and central feature of one embodiment of this invention is that the strip or band of adhesive 76 is of a narrow width so that the structure actually gripping the backings of the two sections of carpet is very narrow, extending only a minimal distance on either side of the actual joint or seam line 80 (FIG. 10). In preferred embodiments the width w (FIG. 8) of the hot melt adhesive 76 is less than about two inches; in one specific embodiment the width w is about one inch to 1¼ inch, and can be even less. To some extent the limit to this narrow dimension depends on the accuracy of centering the tape on installation, so that an adequate width of tape, i.e. adhesive and reinforcement, occurs on each side of the seam line 80 for integrity of the joint during stretching.

In the preferred embodiment shown in FIGS. 8 and 10, the total width of the tape is greater than that of the adhesive and reinforcement, and this total width may be about the same as that of standard carpet seaming irons currently in use (which is typically on the order of 3 inches to 6 inches. Thus, even though the tape could be narrower, essentially the same width as the adhesive and reinforcing, it is made wider principally to accommodate the typical iron already used by the installer, isolating the hot base plate of the iron from the carpet cushion or floor surface below.

In the specific embodiment illustrated in FIGS. 8 and 10, carrier strip margins 82 at left and right of the central hot melt adhesive may have on the upper surface a pressure sensitive adhesive indicated at 83, which should be a hot melt pressure sensitive, for several reasons. A water based pressure sensitive would be dried by the iron and would tend to stick to the iron. The hot melt pressure sensitive allows the hot iron to glide and also wicks into the carpet backing for better gripping. The margin pressure sensitive adhesive, which may be applied by spraying or extrusion during the tape assembly procedure, has the function of adding to the overall integrity of the joint while permitting the carpet backings to shear slightly outwardly over these margins during stretching. As discussed above, the hot melt pressure sensitive adhesive 83 stretches somewhat and becomes "leggy", which allows the carpet during stretching to pull away slightly at these outer margins, concentrating the seam tension in the central adhesive band 76, which is hot melt adhesive, not pressure sensitive and not having the shearing characteristic.

As indicated schematically in FIG. 8, the margin adhesive 83 is covered by some protective covering so that it does not stick to the back of the tape blocking the roll, or to any other surface prior to completion of the installation. One form of protection is a thin plastic film 83a indicated schematically in FIG. 8, with a peeled-back corner shown. The film may be polypropylene, which is meltable by the hot iron to essentially become a part of the adhesive below, or another plastic film with similar characteristics. The protective film 83a is not peeled off the adhesive 83, but left on as the iron is used to make the seam. As an alternative protective covering for the hot melt pressure sensitive adhesive 83, a powder or talc of polypropylene or similar plastic may be deposited or coated onto to the pressure sensitive adhesive 83. Again, this talc will simply melt and become a part of the adhesive during the seaming operation.

It should be understood that the carrier strip margins 82 can be without any adhesive coating, simply extending beyond the width of the hot melt adhesive 76 so that the entire tape width is at least the width of the iron.

As shown in the sectional view of FIG. 10, in the completed carpet seam the strip of hot melt adhesive 76 and the reinforcing 74 (reinforcing 74 not seen) are adhered to the underside of the joined carpet sections 26 and 28, secured to the bottom sides of the carpet backings 86 and 88 of these sections. In FIG. 10 the components of the installation are not to scale, including widths and thicknesses, but are exaggerated to show principles of the invention. The carpet pile is shown at 84. The adhesive 76 extends only a short distance on either side of the joint or seam line 80, and this distance may be about ½ inch to ⅝ inch in a preferred embodiment, as discussed above. The carrier strip or substrate 72 in this embodiment extends further on each side, and may be adhered directly to the carpet backing by pressure sensitive adhesive as described earlier. In accordance with the preferred method of installation of the invention, a strip or bead 90 of hot melt adhesive also directly connects the side edges of the carpet backings, in a butt joint or seam weld (the carpet backing edges are shown separated but are in contact or substantially in contact).

It is therefore seen that the overall construction of the carpet joint, including the seam weld or butt joint formed by the bead of adhesive 90 in cooperation with the narrow band of adhesion of the carpet backings to the tape 70 at either side of the seam line 80, provide a carpet seam of very high integrity which will stand up to stretching and which will not tend to peak upwardly to any significant degree at the joint. Stretching tension across the joint is indicated by arrows 92 in the schematic view of FIG. 10.

As seen in FIG. 10, the line of stretching tension t passes through the carpet backing 86 of the left carpet section, then through the carpet seaming tape 70 (but only in the region of the central hot melt adhesive), and then through the carpet backing 88 of the right carpet section. At the points 94 and 96 indicated in the drawing, the tension is essentially transferred from the carpet backing to the tape, with the carpet backings immediately above this portion of the tape between 94 and 96, not receiving as much tension as the carpet backings outside this area. By making the active central portion of the carpet seaming tape very narrow, with only about ½ inch (and this can be even less) of the carpet backings gripped by the tape on either side of the joint, the carpet seam construction of the invention assures that at least some of the carpet stretching tension will be accepted at the butt joint or seam weld. Some slight relaxation or shifting of fibers within the carpet construction, in the region of the points 94 and 96, as well as possible other shifting factors, is inevitable on each side of the tape over the short distance of such a narrow band, assuring that the seam weld will accept some of the tension. In turn, by having some tension exist entirely through the carpet backings, across the center seam line 80, it is assured that seam peaking will be avoided or at least kept to a minimum. It is also important to the avoidance of seam peaking that the bead or band of seam welding adhesive 90 bonds the carpet backings face to face throughout the height of these carpet backing edges, as opposed to only in a line of tension along the very bottoms of the carpet backings, the only way in which carpet seaming tape can connect the two sections of carpet. It can be envisioned that if two sheets of material, each having a significant thickness, are tensioned across a joint between them, but the joint is held together only by adhesion of a connecting strip to the bottoms of the sheets of material, the tension at the joint will tend to rotate the ends of the sheets upward at the joint. Carpet seaming tape in itself is imperfect in that it connects two bodies only via their bottom surfaces, while the tension through the two bodies is actually carried approximately through the mid point of the height of the bodies.

FIG. 10 shows a joint of the invention, but with a soft peak which is exaggerated, and with other thicknesses out of scale.

The seaming system of the invention, by connecting the two carpet backings only very close to the actual joint, approximates the prior practice of stitching carpet backings together, prior to the advent of carpet seaming tape. Stitched carpets did not exhibit seam peaking. Another advantage of the present system is that the base of the yarns at the backing is locked in with the butt-welding hot melt adhesive, so the yarns do not fray.

Another advantage of the butt weld, irrespective of the acceptance of tension, is that is fixes the carpet edges in place, locking them to each other and down on the tape, reducing the edge rotation of seam peaking, even when a wider tape is used.

Figure 9:
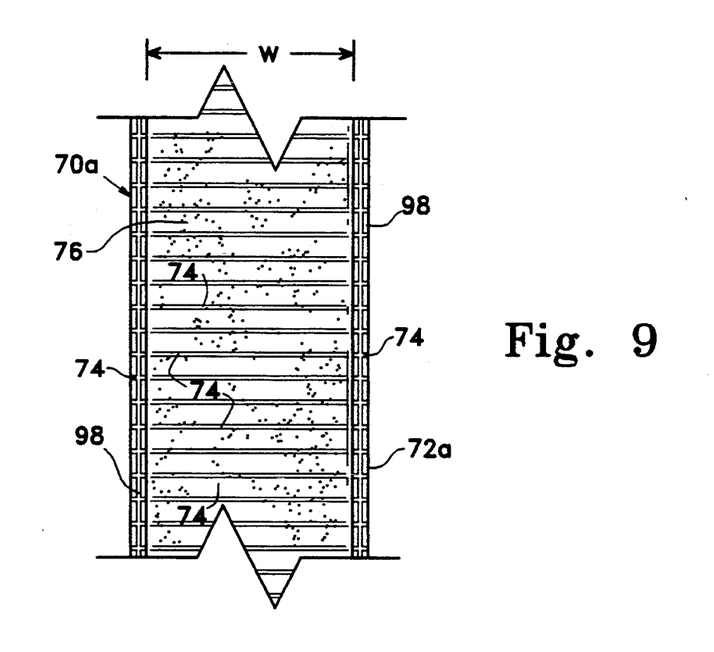
FIG. 9 is a view similar to FIG. 8 but showing another embodiment of a carpet seaming tape of the invention.

FIG. 9 shows another embodiment carpet seaming tape 70a, wherein the carrier strip 72a is essentially the same width as that of the hot melt adhesive 76 and reinforcing fibers 74. As indicated, the carrier strip may have slight margins 98 extending beyond the adhesive, but this is primarily for convenience and efficiency of manufacture as well as prevention of the flowing of molten adhesive off the side edges of the tape during installation. As noted above, the narrower tape 70a preferably is used with a narrower carpet seaming tape iron.

Figure 11:
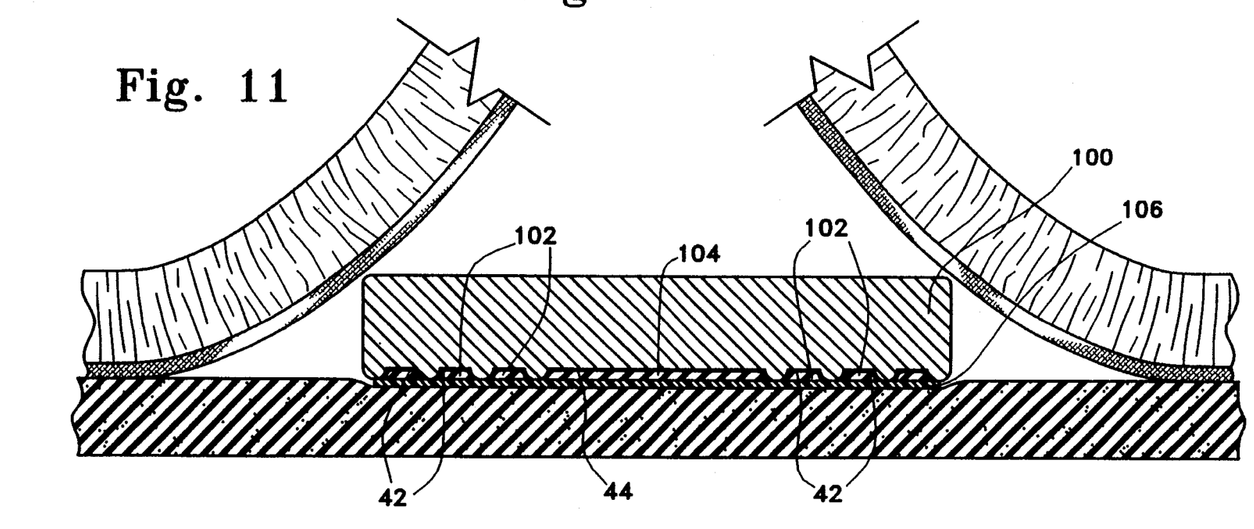
FIG. 11 is a sectional elevation view looking forward through an iron base and carpet seaming tape, showing one preferred embodiment of an iron base groove configuration which is matched to a configuration of hot melt adhesive bead tracks on the carpet seaming tape.

FIG. 11 shows schematically a preferred configuration of an iron base 100 in transverse cross section, with the other components of the iron not shown. The iron can be with or without the molten adhesive ducting feature as in FIGS. 1-4A. As in the embodiment described earlier, particularly in reference to FIG. 2, the iron includes a plurality of parallel grooves 42 at each side, for example three grooves on each side as shown. These grooves are relatively narrow. The base also includes a wide center groove 44, again as discussed with reference to FIG. 2 above. In this embodiment of the invention, the grooves 42 and 44 are matched to the location of hot melt bead tracks 102 and 104 on a hot melt tape 106 as shown in FIG. 11. Thus, a series of parallel bead tracks 102, three in the embodiment shown, are positioned at each side of the tape in parallel and preferably equally spaced relationship. One wide bead 104 (which could be several parallel narrower beads) is positioned along the center line of the tape 106, essentially filling the confines of the wide center groove 44 of the iron. It should be understood that the center band of adhesive 104, characterized as a band, bead or strip, could be a series of narrower beads, and that meaning is intended to be included in the terms.

The carpet seaming tape 106 of FIG. 11 may be of conventional width, such as four inches overall with two to three inches width of adhesive. It may alternatively be narrow-adhesive seaming tape as described above. If the tape is of conventional width, with three inches width of adhesive, examples of the adhesive locations (as well as the matching locations of the grooves on the iron's base) are as follows: Center adhesive strip width, about 1¼ inch; center to center distance between side strips, about ¼ inch; width of side beads, about ⅛ inch or slightly wider.

The matching of the glue bead lines or bead tracks closely to the pattern of the grooves in the iron's base provides a strong guiding feature between the iron and the hot melt carpet seaming tape. The iron and tape are held in alignment by this tracking feature, and particularly the tape is guided to track with the iron. This feature is very important when the narrow carpet seaming tape of the invention is employed in an installation. In that case, the total width spanned by the iron's grooves 42 and 44 is less than 2", since the tape of the invention has a hot melt width of 2" or less.

The above described preferred embodiments are intended to illustrate the principles of the invention, but not to limit its scope. Other embodiments and variations to this preferred embodiment will be apparent to those skilled in the art and may be made without departing from the spirit and scope of the invention as defined in the following claims.

I claim:

1. A carpet seaming tape iron, for use in installing and adhering a hot melt carpet seaming tape to the backings of a pair of adjacent pieces of carpet which are to be seamed and joined, by moving the iron over the hot melt adhesive on the seaming tape from above while working between the two pieces of carpet, comprising,
   a base plate on the iron, and
   liquid channel means in the base plate of the iron and extending up through the base plate for feeding melted liquid hot melt adhesive from the base plate of the iron up to an elevated location near a rear end of the iron, in a position to be applied to opposed edges of carpet backings of the two pieces of carpet as the iron is moved along on the carpet seaming tape, between the two carpet edges,
   whereby, as the two carpet edges come together at the back of the advancing iron, they are seam welded in a butt joint by the hot melt adhesive, adding strength to the seam in the carpet and supplementing the strength afforded by adhesion of the seaming tape to the carpet backings.

2. The carpet seaming iron of claim 1, wherein the liquid channel means includes a pair of left and right adhesive dispensing orifices each positioned to apply adhesive on the edge of one of the carpet backings.

3. The carpet seaming iron of claim 1, wherein the liquid channel means includes a plurality of adhesive outlets positioned to apply adhesive on the edges and the lower side of the carpet backings.

4. The carpet seaming iron of claim 1, wherein the base plate has a wide center groove, with a bottom orifice of the liquid channel means located in the wide center groove, toward the rear.

5. The carpet seaming iron of claim 4, wherein the base plate has at least one narrow groove on each side of the wide center groove.

6. The carpet seaming iron of claim 1, further including carpet edge guide means connected to the iron, for guiding the carpet in a predictable path such that the opposed carpet backing edges are guided alongside the liquid channel means so hot melt adhesive is applied to the backing edges.

7. The carpet seaming iron of claim 6, wherein the carpet edge guide means further includes means for holding carpet pile away from the hot melt adhesive issuing from the liquid channel means, such that adhesive is prevented from being applied to the carpet pile and a user of the iron may more clearly view the application of hot melt adhesive to the carpet edges to ensure the edges are joined properly.

8. The carpet seaming iron of claim 1, further including carpet edge guide means connected to the iron for engaging the backing and edges of the two carpet pieces as the iron advances relative to the carpet pieces, the carpet edge guide means being adjacent to an upper, outlet end of the liquid channel means, so that the carpet backings are guided adjacent to the outlet end of the liquid channel means such that the melted hot melt adhesive is applied to the edges of the carpet backings.

9. The carpet seaming iron of claim 8, wherein the carpet edge guide means comprises a pivoted tail piece with pivot means enabling the tail piece to swing upwardly as needed to accommodate the thickness of the carpet pieces passing along the guide means, and spring means biasing the tail piece to urge the carpet edge guide means downwardly.

10. The carpet seaming iron of claim 9, wherein the carpet edge guide means further includes means for holding carpet pile away from the hot melt adhesive issuing from the liquid channel means, such that adhesive is prevented from being applied to the carpet pile and a user of the iron may more clearly view the application of hot melt adhesive to the carpet edges to ensure the edges are joined properly.

11. The carpet seaming iron of claim 1, further including indicator light means positioned on the iron so as to be readily visible by the user, for indicating when power is connected to the iron and for indicating when the iron has reached operating temperature, by two different modes of illumination of the indicator light means.

12. The carpet seaming iron of claim 11, wherein the indicator light means includes red indicator light means for indicating that power is connected to the iron, and green indicator light means for indicating when the iron has reached operating temperature.

13. The carpet seaming iron of claim 12, further including audible signal means on the iron for sending out a signal audible to the user when the iron has reached operating temperature.

14. The carpet seaming iron of claim 1, further including audible signal means on the iron for sending out a signal audible to the user when the iron has reached operating temperature.

15. The carpet seaming iron of claim 14, further including audible warning signal means for sending out a different signal audible to the user to indicate when the iron has been left powered and hot for a pre-selected period of time without any movement of the iron.

* * * * *